United States Patent [19]

Verdesca et al.

[11] Patent Number: 5,320,238
[45] Date of Patent: Jun. 14, 1994

[54] END CLOSURE METHOD AND CONSTRUCTION FOR NON-METALLIC PRESSURE VESSELS

[75] Inventors: Anthony F. Verdesca, Singer Island; Orlando Borrajo, Hialeah; Alfredo Lorenzo-Luaces, Miami, all of Fla.

[73] Assignee: Fib-R-Fit, Inc., Opalocka, Fla.

[21] Appl. No.: 896,215

[22] Filed: Jun. 10, 1992

[51] Int. Cl.⁵ .................. B65D 45/30; B65D 53/02
[52] U.S. Cl. .................. 220/327; 220/319; 220/240; 220/661; 220/678; 285/121; 285/332; 285/915
[58] Field of Search .............. 285/121, 332, 915; 138/109; 220/304, 319, 240, 315, 327, 89.2, 661, 678, 680, 582; 215/276, 270, 356; 264/155, 156

[56] References Cited

U.S. PATENT DOCUMENTS

| | | | |
|---|---|---|---|
| 2,141,847 | 12/1938 | Tennant | 220/89.2 X |
| 2,490,328 | 12/1949 | Van Fleet | 285/121 |
| 2,536,321 | 1/1951 | Smith et al. | 220/89.2 |
| 2,576,431 | 11/1951 | White | 220/89.2 |
| 2,862,641 | 12/1958 | Philipp | 220/89.2 |
| 3,302,664 | 2/1967 | Plamann | 220/304 X |
| 3,419,173 | 12/1968 | Verlinden | 220/304 X |
| 3,951,172 | 4/1976 | Flegel | 220/304 X |
| 4,319,076 | 3/1982 | Piur | 285/332 X |
| 4,630,635 | 12/1986 | Bernstein et al. | 138/109 X |
| 4,739,899 | 4/1988 | Thompson et al. | 220/240 |

Primary Examiner—Allan N. Shoap
Assistant Examiner—Vanessa Caretto

[57] ABSTRACT

An end closure fabrication for a generally cylindrical non-metallic pressure vessel having an opening at one end thereof which includes a collar which is adhesively bonded to sides of the vessel adjacent to the open end of the vessel. A circular end pressure plate equipped with an annular seal is inserted in the end of the vessel and an end cap to secure the pressure plate is attached over the collar.

6 Claims, 2 Drawing Sheets

END CLOSURE METHOD AND CONSTRUCTION FOR NON-METALLIC PRESSURE VESSELS

BACKGROUND OF THE INVENTION

The present invention finds its application with respect to non-metallic (i.e. plastic) pressure vessels of the type used to provide continuous separation of contaminants from liquids. Such systems usually employ osmotic separation under high pressure, utilizing a long chamber or pipe which is packed with a membrane or thousands of filters which act to separate the contaminant, for example salt, from the liquid carrier, for example sea water. These principles have been well developed and the filtering or osmotic functions do not per se form part of the present invention.

Pressure chambers for the above purpose have generally been constructed of metallic components which are made and assembled by the manufacturing source. Special orders require customization and take time to fill. Inventories of stock items must be carried at considerable expense.

In addition, metallic pressure chambers, even stainless steel or those specially treated against corrosion, will over a period of time nevertheless deteriorate when subjected continuously to the effects of corrosive liquids such as seawater. It is the purpose of the present invention to disclose a non-metallic pressure chamber which incorporates a unique and extremely versatile end closure construction which solves the problems inherent hereto in the design and fabrication of prior equipment of this type.

SUMMARY OF THE INVENTION

The present invention includes both a method of fabrication and the resulting fabrication itself consisting of an end closure for non-metallic pressure vessels. Such vessel, of cylindrical shape have design selected lengths, wall thicknesses etc. to satisfy internal pressure requirements. The invention teaches the use of standard or stock lengths of such cylindrical vessels choosing the requisite diameter and wall thickness, cutting the stock to the required length (which may be at the job site) then forming a taper in the exterior surface of the vessel adjacent to and extending to each end of the vessel. A preformed collar having a matching internal taper is then adhesively bonded, taper to taper to form an extension at each end of the vessel, the collar having a wall thickness usually several times that of the wall thickness of the vessel itself. Thus the wall thickness of the combined tapered area provides a means to permit access to the interior of the vessel by first drilling a cylindrical opening through the tapered area through which may be inserted and adhesively bonded an internally threaded plug which subsequently may form a fluid-tight external means of connection. The next step in forming the end closure shall be to insert in each end of the vessel a circular pressure plate having an O-ring or other suitable seal about its periphery. In order to retain the pressure plate, a cylindrical end cap is attached to the collar by being threaded thereupon to complete the end closure assembly. The use of such threaded attachment permits subsequent access to the interior of the vessel at each end when needed. The end pressure plate shall abut the interior of the cap during operation of the pressure vessel, since internal pressure in the vessel will force the pressure plate against the cap.

DESCRIPTION OF A PARTICULAR EMBODIMENT OF THE INVENTION

Figure 1:
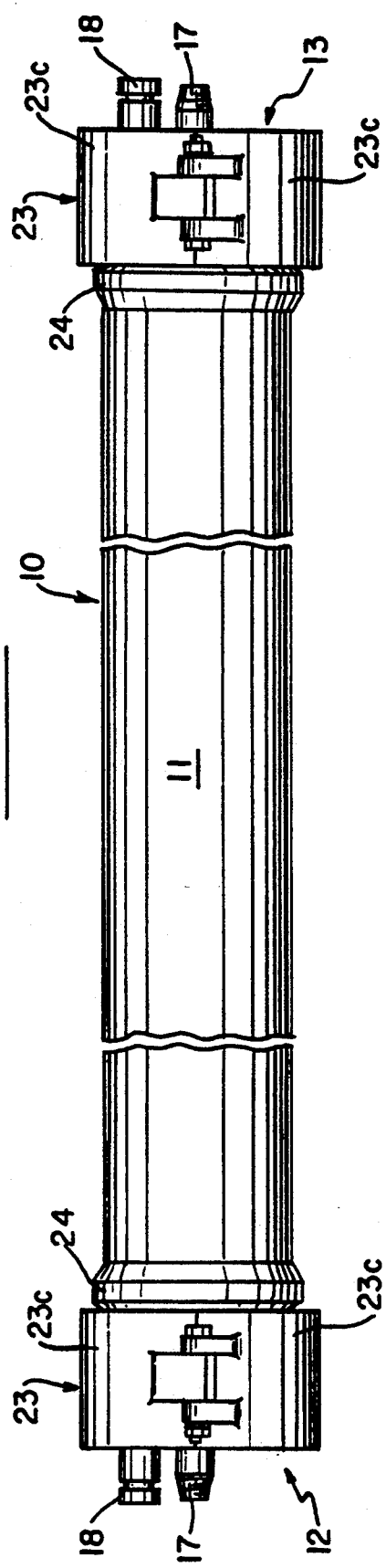
FIGS. 1 and 2 are respectively exterior side and sectional views of a representative prior art pressure chamber for the separation of contaminant(s) from a liquid utilizing osmotic principles.
Figure 2:
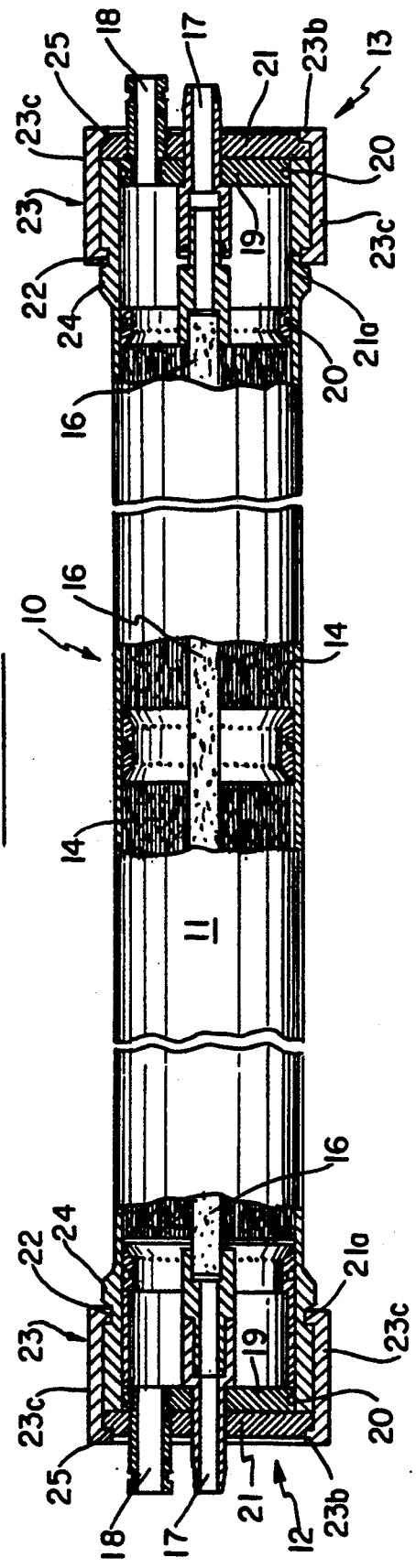
Figure 3:
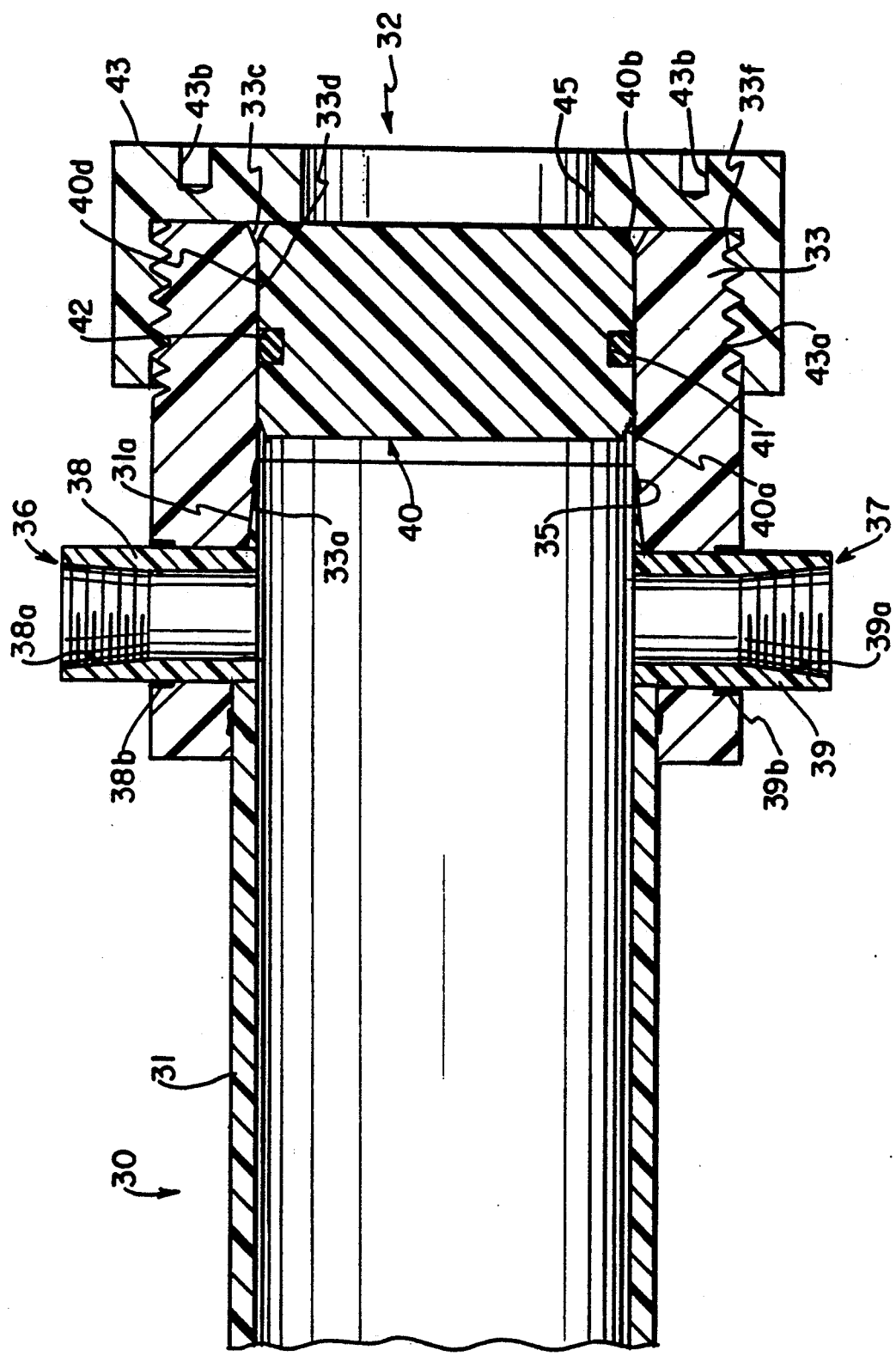
FIG. 3 illustrates the main body section and end closure of a pressure vessel having a function similar to that of the vessel of FIGS. 1 and 2 and which incorporates the principles of the present invention.

Prior to describing in detail the particular embodiment of the invention illustrated in FIG. 3, to better describe the current state of the art and to contrast the inventive improvements thereover, the prior art construction illustrated in FIGS. 1 and 2 shall first be described. What has been illustrated is a pressure chamber 10 consisting of an elongated main section 11 of pipelike configuration having two end closure sections 12 and 13 at the opposite ends thereof. In this example, the pressure chamber 10 has been designed to include means for separating a contaminant or contaminants (i.e. salt) from seawater using osmotic principles. It is not the purpose of this description to describe in detail the physical structure and means for such purpose; but rather to describe the improved means of the invention which resides in the design and construction of the end closure(s) of pressure vessels of the type illustrated in FIGS. 1 and 2 and the use of only non-metallic materials for the construction of such pressure vessels.

In brief therefore the pressure vessel illustrated in FIGS. 1 and 2 includes in the main section thereof a membranous mass 14 which in the present embodiment consists of tightly packed generally parallel hollow fibers of extremely small diameter arranged lengthwise within section 11 around an axially arranged cylindrical passage 16. Various inlet and outlet passages and pipes 16-19 are shown through which the contaminant is admitted, passes through the membranous mass 14 and is then discharged as treated water.

It will be observed that at each of the vessel 10, closure sections 12 and 13, identical in construction, provide the means for ingress and outflow respectively of the contaminated effluent and of the desalinated effluent through pipes 17 and 18. Additionally each closure section includes a pressure plate 19 which is grooved about its periphery to retain annular O-ring seal 20 and immediately adjacent thereto, an end closure plate 21 which as shall be described retains the pressure plate 19 in position.

It will be noted that adjacent to each end of vessel 10 an annular bead 24 and a groove 22 has been formed therein to admit one end 21a of a split clamp 23. End closure plate 21 has been recessed at 25 to accept engagement of the outer end 23b of clamp 23. As illustrated in FIG. 1, the two halves of the clamp 23 generally indicated by reference numeral 23c are bolted together to secure and complete the end closure assemblies in fluid-tight sealed relationship with section 10 of the pressure vessel. Since internal pressure within a typical vessel 10 may be several hundred pounds per square inch static pressure and test pressures may be several multiples thereof, it can be understood that care must be taken in the design and fabrication of end closures such as has been illustrated.

The improved pressure vessel and end closure construction according to the present invention shall now be described with reference to FIG. 3. In the illustrated embodiment constructed entirely of non-metallic plastic (preferably fiberglass reinforced plastic material) a pressure vessel 30 has a cylindrical central or main section 31 and two identical end closure sections 32, only one of which has been illustrated. The function of vessel 30 may be that of separating contaminants from a liquid or have other functions as will be appreciated by those skilled in the art. It will therefore be understood that wall thickness and thread size engagement and so forth may be varied from one design to another to accommodate a range of internal pressures, volumes and functions.

It will be seen that the outside diameter of the end of section 31 has been formed to have a gradual taper 31a which will be accomplished by first cutting the section 31 to a prescribed length and then grinding the end of section 31 to form the design specified angle of taper. Both of these operations can be performed at the installation site using simple tooling and using stock or standard length cylindrical sections as may be required.

A cylindrical outer collar 33 supplied to the work site as standard equipment, and having an internal taper 33a matching taper 31a of section 31 will be adhesively bonded along the common interfaces of tapers 31a and 33a as indicated by reference numerals 34, 35. The joint thus formed when properly set and cured shall have radial and axial strengths which shall exceed that of section 31 itself, since the combined thicknesses of section 31 and collar 33 greatly exceed the wall thickness of section 31.

Because the end closure construction of the present invention provides a greatly increased wall thickness in the illustrated embodiment, two side ports 36 and 37 may be installed to provide entry to vessel 30 adjacent to each end closure assembly 32. Again, installation of each part can readily be made at the job site by drilling radially through collar 33 and section 31 a cylindrical bore in the tapered area and thereafter inserting and adhesively joining therein at 38b, 39b matching sized plugs 38 and 39 which are internally threaded at 38a, 39a. Plugs 38a and 39a ideally extend through the wall of section 31 and are flush with the interior thereof. This arrangement also provides additional strength axially between the mating members 31 and 33 for end closure purposes.

After assembly and joining of the parts as thus far described, and after the interior of section 31 has been cleaned thoroughly to remove foreign material such as fragments of drilled material, dust, etc., end pressure plate 40 shall be inserted in the closure opening. The external diameter of plate 40 and the internal diameter of collar 33 should permit an easy sliding fit, the opposing end surfaces having been chamfered at 33c, 40a and 40b to facilitate insertion of plate 40 into the end of section 31. Pressure plate 40 has been provided with an annular groove 41 which receives an O-ring to effect a seal between the interior diameters 33d and 40d of collar 33 and pressure plate 40.

To effect end closure and final assembly of the illustrated parts, a cylindrical cap 43 is attached over the collar 33 by engagement of respective matching threads 33f and 43a. Spanner wrench openings 43b permit rotation of cap 43 for this purpose. As shown, cap 43 radially extends across the end closure opening 45 so that pressure plate 40 shall (because of internally acting pressure within vessel 30) impinge upon cap 43 to prevent axial movement of plate 40 from opening 45, while effecting fluid sealing of the opening. In order to service the interior of vessel 30, cap 43 may be removed as needed because of its threaded attachment to collar 33.

Certain significant advantages may be noted when a comparison is made between the end closure of the invention and the current state of the art end closure shown in FIGS. 1 and 2. First, the end closure of FIGS. 1 and 2 requires the use of a clamp which necessitates the formation of a groove in the external wall surface of the vessel. The position of the groove dictates the length of the vessel, that is, the vessel having a prescribed length, must be manufactured in its entirety in a manufacturing facility. This requires the maintenance of inventory of pressure vessels to fit various pressure and size requirements and adds undesirable expense. By contrast, the end closure taught by the present invention requires that a stock length, diameter and wall thickness cylindrical pipe be sent to a job site where it may be cut to length. It is also possible to couple standard body lengths. The vessel is tapered at each end using simple tooling and collars (already internally tapered and stocked at the manufacturing source) which are adhesively bonded to each vessel end at the site. The end pressure plates are inserted and the caps threaded externally over the collars. If side entry ports are desired, the illustrated simple procedure accomplishes this objective.

In addition to the facility described above, the use of non-metallic (plastic) components throughout is important within the field and function of use. The materials used are entirely non-corrosive which greatly extends product life and renders such pressure vessels virtually leak-proof. Standing water cannot attack metallic materials, because there are none. The materials may be colored dark blue throughout to eliminate formation of algae or other growth.

Membranes can be inserted from either end of a pressure vessel constructed according to the invention. There are no internal grooves (current design often includes such grooves to retain lock-rings) to inhibit passage of membranes and end plates. Threaded holes in end plates may be minimized since the design provides side port entry; thus reducing end piping connections and disconnections.

End sections may be produced in volume and taken from inventory as needed and as specified lengths are ordered. Body sections can be made in any length, coupled in any length and then custom cut to length. An example of coupling means for non-ferrous pipe has been shown in U.S. Pat. No. 4,537,426. This results in time and manufacturing savings at the factory and on the job site. The present design is safe for installation crews and operating personnel which currently must contend with metal snap rings, pipe disconnections, corroded fittings and the like.

It will be understood that the foregoing description of the inventive concept has related to a particular embodiment and is therefore representative. In order more fully to appreciate and understand the invention, reference should be made to the appended claims.

It is claimed:

1. An end closure for cylindrical non-metallic pressure vessels comprising:
   a) a main vessel section defining at least one end thereof a generally circular opening comprising a closure end thereof;

b) said main vessel section defining external and internal wall surfaces, said external wall surface being tapered toward said opening adjacent to said closure end;

c) a generally cylindrical collar arranged over the tapered end of said main vessel section;

d) said collar defining external and internal wall surfaces, said internal wall surface being tapered to fit closely against the external tapered wall surface of said main vessel section;

e) means for bonding the external tapered wall surface of said main vessel section to the internal tapered wall surface of said collar;

f) a circular end pressure plate within said main vessel section immediately adjacent to the closure end thereof forming a sliding fit within said main vessel section;

g) means for effecting a fluid seal between said plate and said main vessel section; and h) an end cap having a cylindrical flange fitted over and attached to said collar, said cap abutting said pressure plate within said main vessel section.

2. The end closure of claim 1 wherein said collar is externally threaded and said cap is internally threaded to form an attachment between the collar and the end cap.

3. The end closure of claim 1 wherein at least one aperture is formed extending radially through said collar and main vessel section to permit fluid passage therethrough.

4. An end closure for cylindrical pressure vessels comprising:

a) a cylindrical main vessel section having a predetermined wall thickness, said section defining at least at one end thereof a closure opening;

b) a generally cylindrical collar closely fitted over and adhesively bonded to the closure opening of said vessel to provide additional wall thickness at the end of said vessel adjacent to the closure end thereof;

c) a cap having a circular end wall to form a closure of the end closure opening of said vessel; said end cap having a generally cylindrical flange fitted closely over the open end of said collar;

d) means for attaching said flange to said collar, and e) a circular pressure plate within said vessel abutting said cap, said pressure plate being free to move axially therein and carrying sealing means to effect a fluid seal between the plate and the interior of said vessel.

5. The end closure according to claim 4 wherein said vessel and collar are joined along contacting tapered surfaces and the collar has a wall thickness which is greater than the wall thickness of said vessel.

6. The end closure of claim 5 wherein at least one fluid connection is formed in the vessel through the collar into the interior of the vessel.

* * * * *